Figure 2:
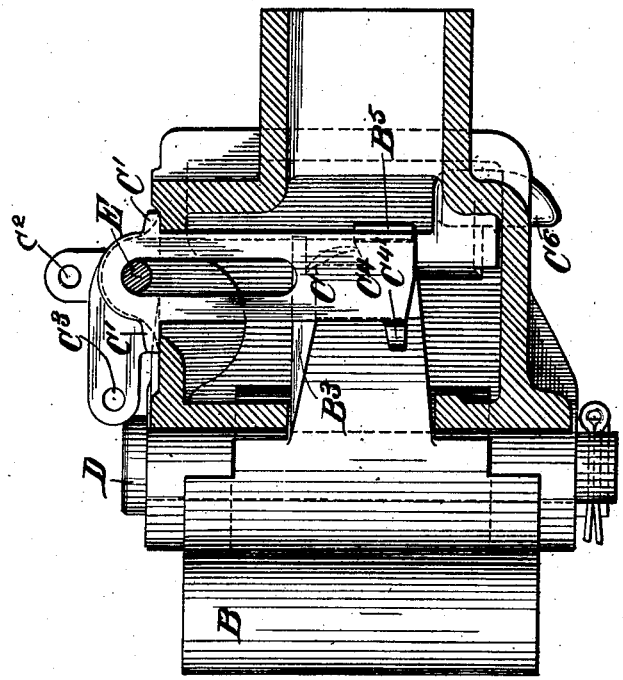

No. 861,869. PATENTED JULY 30, 1907.
A. LIPSCHUTZ.
CAR COUPLING.
APPLICATION FILED MAR. 5, 1907.

4 SHEETS—SHEET 1.

Witnesses:
Inventor
Arthur Lipschutz

No. 861,869. PATENTED JULY 30, 1907.
A. LIPSCHUTZ.
CAR COUPLING.
APPLICATION FILED MAR. 5, 1907.

4 SHEETS—SHEET 2.

Witnesses
A. W. Nelson
John R. Lepeure

Inventor
Arthur Lipschutz
by
Atty.

No. 861,869. PATENTED JULY 30, 1907.
A. LIPSCHUTZ.
CAR COUPLING.
APPLICATION FILED MAR. 5, 1907.

4 SHEETS—SHEET 3.

Witnesses:

Inventor
Arthur Lipschutz

No. 861,869. PATENTED JULY 30, 1907.
A. LIPSCHUTZ.
CAR COUPLING.
APPLICATION FILED MAR. 5, 1907.
4 SHEETS—SHEET 4.
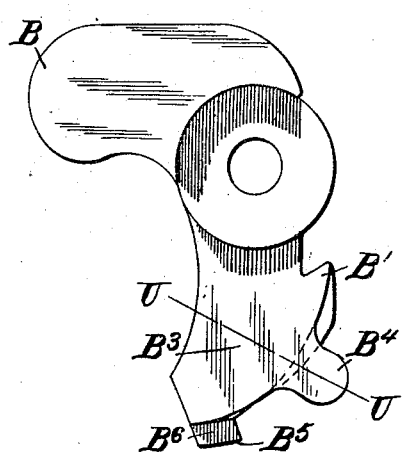
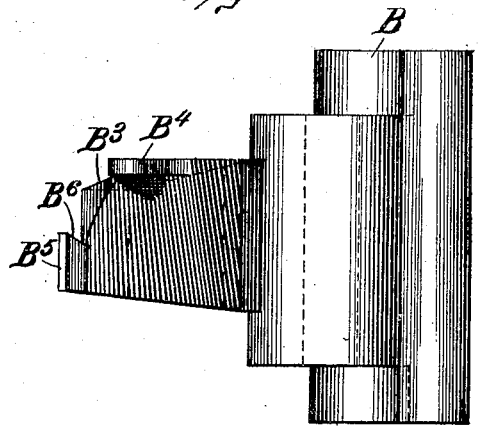
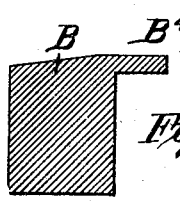
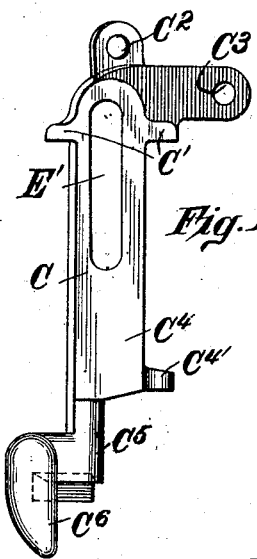
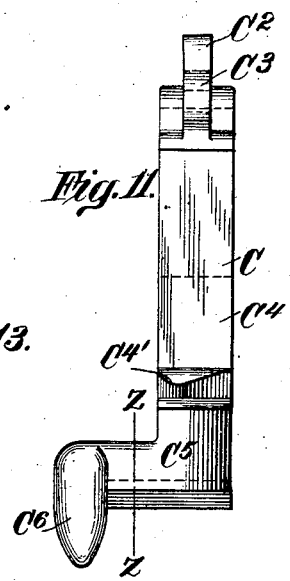
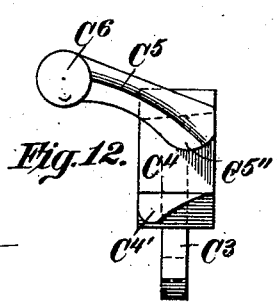
Witnesses
Inventor
Arthur Lipschutz

UNITED STATES PATENT OFFICE.

ARTHUR LIPSCHUTZ, OF CHICAGO, ILLINOIS.

CAR-COUPLING.

No. 861,869. Specification of Letters Patent. Patented July 30, 1907.

Application filed March 5, 1907. Serial No. 360,653.

*To all whom it may concern:*

Be it known that I, ARTHUR LIPSCHUTZ, a citizen of the United States, and a resident of Chicago, Cook county, Illinois, have invented a certain new, useful, and Improved Car-Coupler, of which the following is a true, exact, and clear description, such as will enable others skilled in the art to which it appertains to make and use the same.

My invention relates to improvements in car couplers and has special reference to improvements in automatic car couplers of the Master Car Builders type.

The object of my invention is to provide an automatic car coupler of extremely simple construction which shall be composed of a minimum number of parts; the parts of which shall be so formed as to admit of easy assembling and finally to provide a coupler which shall be of minimum weight and of low cost.

A further and particular object of my invention is to improve the method and means of securing the knuckle of an automatic coupler in either unlocked or locked position.

A still further object of the invention is to provide an automatic coupler which shall be provided with or contain means for positively opening the knuckle of the coupler, which means shall preferably be in the same part or member with the knuckle locking device.

A further purpose of my invention is to provide an automatic coupler of such construction that the forces of gravity and direct leverage shall alone be employed in the locking, unlocking and opening of the knuckle of the coupler.

Still further objects of my invention will appear hereinafter.

My invention resides generally in an automatic coupler, comprising a coupler-head and swinging knuckle, in combination with a knuckle locking member, movable in said head and adapted for engagement with the knuckle itself, in such manner that when raised, it will assume and remain in unlocked position thereon until the knuckle is thrown out and returned or is otherwise violently disturbed.

My invention also consists in an automatic coupler comprising a coupler head and swinging knuckle, in combination with a locking pin or member, adapted for vertical and swinging movement in said head and which when so moved operates to lock the knuckle or unlock and positively open the same.

My invention also consists in an automatic coupler comprising a coupler head and swinging knuckle, in combination with a single knuckle locking, unlocking and throwing member, arranged in said head for operation by the usual pin operating device on a car end.

My invention also consists in peculiar constructions or formations of the members of a coupler and in combinations of parts, all as hereinafter described and particularly pointed out in the claims.

Figure 1:
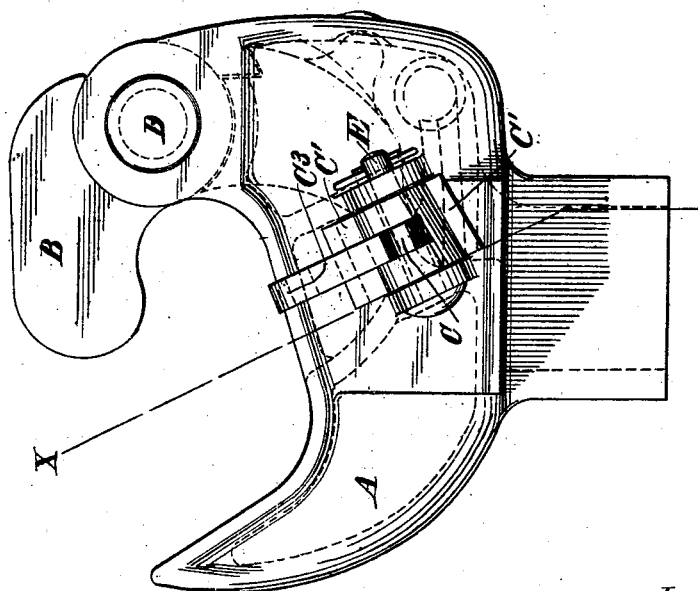
Figure 4:
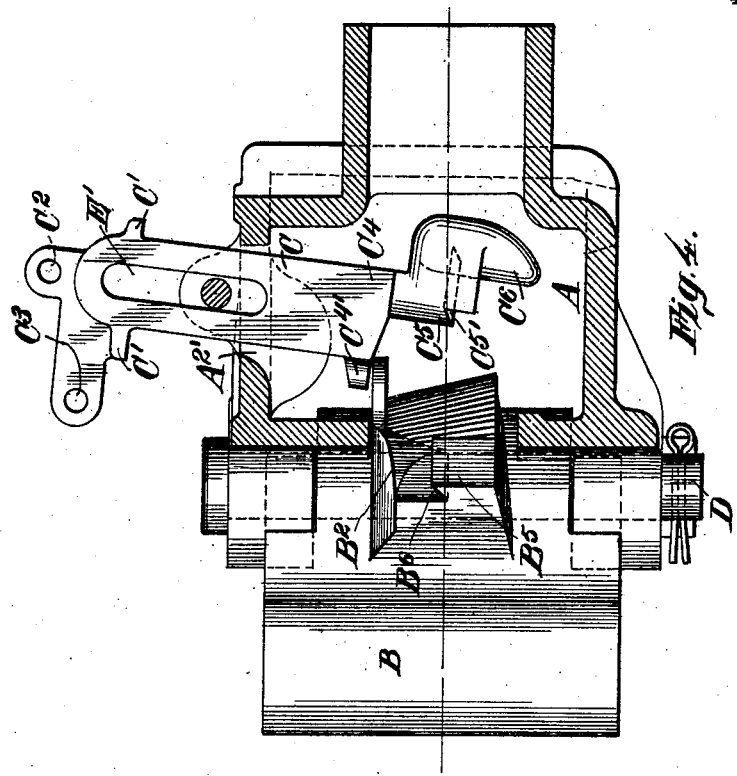
Figure 3:
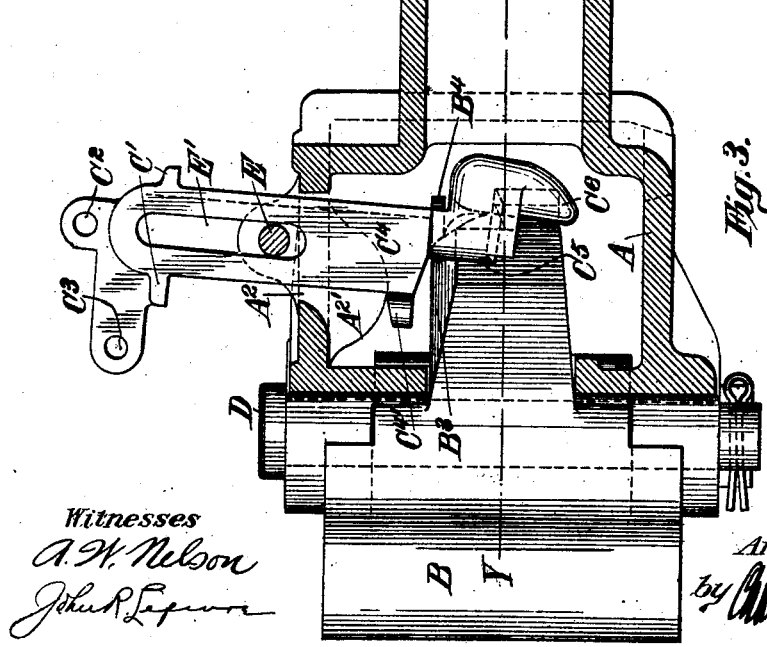
Figure 6:
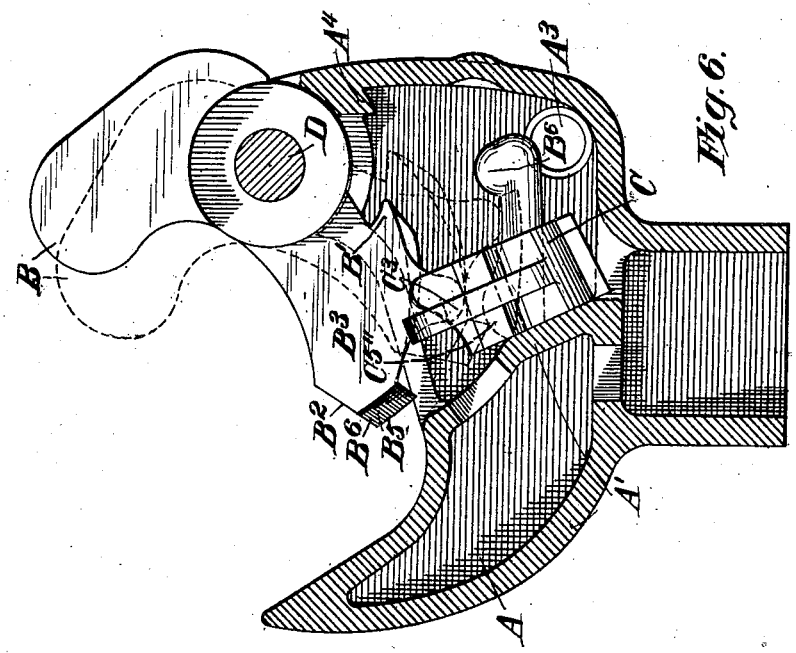
Figure 5:
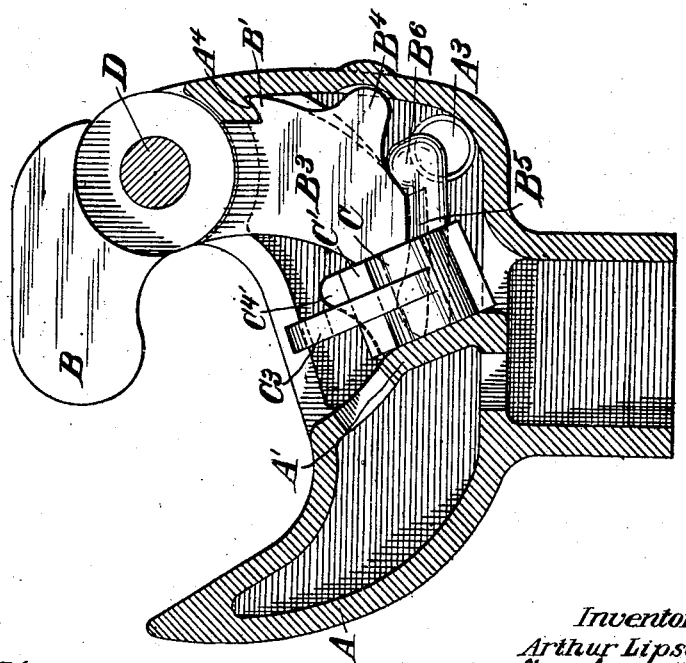

The invention will be more readily understood by reference to the accompanying drawings forming a part of this specification, in which;

Figure 1 is a plan view of an automatic coupler embodying my invention; Fig. 2 is a vertical longitudinal section thereof on the line, X—X, of Fig. 1; Fig. 3 is a like vertical section showing the position of the members in lock set or unlocked positions; Fig. 4 is a like sectional view showing the members as they appear after the knuckle has been thrown open; Fig. 5 is a horizontal section, substantially on the line, Y—Y of Fig. 3, the knuckle locking and throwing member or pin being shown in full lines; Fig. 6 is a similar horizontal section showing the members as they appear when the knuckle is open; Fig. 7 is a plan view of the knuckle; Fig. 8 is a rear elevation thereof; Fig. 9 is a vertical section on the line, U—U, of Fig. 7; Fig. 10 is an outer side elevation of the knuckle locking and throwing member; Fig. 11 is a front elevation thereof; Fig. 12 is a plan view of said member from beneath; and Fig. 13 is a sectional detail on the line, Z—Z, of Fig. 11.

As shown in the drawings my novel automatic coupler in its preferred form, comprises only three main parts or members, namely, the coupler head, A, the knuckle, B, and the pin, C; together with two minor parts, namely, the pivot pin, D, and a small fulcrum bolt, E. These members are remarkable for their simplicity. The coupler head is a simple hollow casting of the required shape. Its walls may be of substantially uniform thickness throughout and unlike many others the interior of the head is marked by the absence of the usual internal lugs, projections and walls, having only the single vertical wall or stop portion which provides the side bearing for the coupler locking pin. Aside from necessary coreprint openings within the head the same contains only three openings. One the large opening in its front wall wherein the knuckle swings, another in the top of the head to receive the locking pin and a third small opening in the bottom of the coupler which accommodates the lower end of the pin when at rest. The knuckle, B, except for certain lugs or projections upon its inner side, required to properly coact with a locking pin of the peculiar form herein shown is of simple and typical outline or conformation. It is pivoted in the head by the pin, D, in the usual manner, the tail of the knuckle swinging freely through the large opening in the coupler head. The locking pin, C, of my coupler is of such form that it may be inserted into the head through the opening in the top thereof. It is vertically movable or slidable in the opening and in addition to this motion is adapted to pivot or swing back and forth upon the pin, E, which crosses the opening in the top of the coupler. By so arranging the pin I adapt it not only to unlock the knuckle but also to follow or force the knuckle outward, the pin itself forming the knuckle thrower o opener. This one member of the coupler fulfils the functions of three separate parts which are found in some couplers hitherto devised, to-wit, a knuckle locking device, a lock securing or setting device and a knuckle opener. The desirably exact operations of the locking pin and the tail of the knuckle, whatever the peculiar designs thereof may be, and many are included within the scope of my invention, are brought about by peculiar co-acting formations thereon.

Having now definitely set forth the general construction, characteristics and functions of the members of a coupler embodying my invention and having plainly stated that the invention may be embodied in a like number of members or elements of various forms adapted to preserve the functions described, I shall now proceed to the description of that specific form of my invention which is detailed in the drawings.

The outlines of the coupler head and of the knuckle as shown, preferably, though not necessarily, conform to the rules and standards laid down by the Master Car Builders Association. This is particularly true of the form of the jaw or opening of the coupler head and of the external portion of the knuckle. The partition, A', within the coupler head, instead of being parallel with the longitudinal axis of the coupler, as in most cases, is formed at an angle thereto; for the reason that I find it desirable to have my novel locking pin swing in a vertical plane at an acute angle to the coupler axis; movement thereof in such plane being substantially at right angles to the tail of the knuckle, when in open position, and best adapted to throw the knuckle open. Notwithstanding the illustration of the angularly positioned pin and wall, A', I desire that it shall be understood that the swinging movement of the locking pin may be in alinement with the axis of the coupler it being entirely possible to preserve all of the required functions in a coupler of such design. This fact will be readily understood by those skilled in the art and will be made still more evident hereinafter. The opening, A$^2$, in the top of the coupler takes its position from the wall, A', its side being a continuation thereof. The pin is therefore guided by the wall, A', assisted by the opposite wall, A$^{2'}$ of the pin hole. The position of the hole, A$^3$ in the bottom of the coupler head is determined by the form of the lower end of the pin, which normally projects therethrough as shown in Fig. 2.

The knuckle as stated is in the main of the common type hinged or pivoted upon the pin, D. The knuckle and the head are provided with the usual interlocking lugs or ribs, B$^1$ and A$^4$, to prevent their separation in event of the accidental breaking or the removal of the pivot pin. The locking face or end, B$^2$, on the tail of the knuckle normally engages the side of the locking pin, standing parallel with the wall, A'. The upper surface, B$^3$ of the knuckle is outwardly inclined, terminating at its inner and highest part in a shelf or lug, B$^4$. As further explained hereinafter the wedge shape or inclined part of the knuckle tail, when the knuckle is swung open serves to elevate the pin sufficiently to free it from its lock set condition and support it against falling until the knuckle is again fully returned. This portion of the knuckle tail coacts with a like projection upon the locking pin. At the end of the knuckle tail, but on the rear side thereof, is a projection or lug, B$^5$. This forms one member of the so-called lockset, the same having a downwardly and inwardly inclined surface or top, B$^6$, which coacts with a like projection and surface on the locking pin. As shown the pin when once raised preferably finds its entire support on the knuckle itself, but I desire that it shall be understood that in some forms of my invention, I support the pin in its raised or lock-set position by permitting its lower end to rest upon the bottom of the coupler head. However, while the pin may be readily supported in this manner from and after the first outward swinging movement of the knuckle, I nevertheless much prefer that in its lockset position the pin shall directly engage and be supported by some portion of the tail of the knuckle, such connection being the most positive obtainable and most conducive to the positive throwing back of the pin by the knuckle when the latter is closed. Referring to Fig. 4, it will be seen that the downwardly inclined top of the knuckle permits the pin to fall slightly as the knuckle is being closed, ultimately causing the lug, B$^5$, to strike the lower part of the locking pin and force it back out of the way, thereby permitting the knuckle to assume its closed position after which the pin falls into place between the end of the knuckle and the stop or wall within the coupler head.

As before stated my novel locking pin performs the threefold function of locking the knuckle in its closed position, of securing or setting the knuckle and pin in unlocked position and of opening the knuckle. In its normal position it prevents the knuckle from swinging outward; when it is raised out of this position it automatically engages the rear side of the knuckle tail and is supported thereby with its locking portion or block entirely above the knuckle tail so that the latter may swing outward freely; and, when after the pin has been placed in lockset position it is swung forward by a backward pull upon the upper end of the pin, it strikes the rear side of the tail of the knuckle and positively forces it outward. The construction is such that the lower end of the pin may remain in contact with the tail of the knuckle until the latter reaches its outermost position, hence, if at any time the full throw of the knuckle is not accomplished by the stroke imparted to the pin, the operation of the latter may be forcibly repeated or completed to fully open the coupler. Given a coupler head and knuckle, a plural function locking pin embodying my invention could readily be constructed by any good mechanic after studying the foregoing description of the pin, but a pin of the peculiar configuration which I prefer will be best understood by further reference to the drawing. Thus for example I prefer that the locking pin shall be pivotally engaged with the coupler head; providing a fulcrum of one kind or another, whereon, the pin may be swung by simply forcing back the projecting upper end of the pin. As the most convenient means of thus attaching the pin to the coupler, I provide the pin with a vertical slot, E', and employ the hereinbefore described cross pin, E, therein. The hole in the top of the coupler is larger than the pin so that the pin may swing freely on the fulcrum, E. The upper end of the pin, above the top of the coupler head is provided with horizontal ribs, C', which close the hole, A$^2$, when the pin is down. The pin is also provided with one or both of the eyes, C$^2$—C$^3$, wherein the end of the operating link or chain is secured. As a rule the operating chain may be attached directly to the upper end of the pin, as the operating devices commonly used, all tend to draw back the locking pins to which they are attached. In rare cases however, the operating devices too far overhang the coupler head and in such cases I prefer that the pin shall have the forwardly extending arm or eye, C³, to insure the proper swinging movement of the pin when the mechanism on the end of the car is operated. The lower portion of the pin which is within the coupler head is made up of the locking block portion, C⁴, the lock set portion, C⁵, and the knuckle throwing portion, C⁶. The portion, C⁴, takes its shape from the space between the end of the knuckle and the wall, A′, of the head. The lower end of this portion, C⁴, including the lug or shelf, C⁴′, is adapted to rest upon the top of the knuckle tail when the pin is raised and the knuckle thrown forward. The lockset portion, C⁵, is rearwardly offset with relation to the part, C⁴, to avoid the end of the knuckle when the latter is opened. The lower end of C⁵ is provided with a rearwardly and upwardly inclined surface, C⁵′, corresponding to the surface, B⁶, on the knuckle and when the pin is first raised by an upward and backward pull upon its upper end, the portion, C⁵, swings over the, then adjacent, knuckle-lug, B⁵, and rests thereon supporting the pin in the position shown in Fig. 3, i. e., in lockset position, in which position the kunckle is free. In couplers having knuckles of the form shown in the drawings, I prefer to laterally offset the knuckle throwing portion, C⁶, in order that the same may positively engage the rear side of the knuckle without interfering with the lockset lug thereon. This is the only office which the portion, C⁶, needs to perform and by slightly changing the relative shapes of the knuckle and the pin, the knuckle throwing end or extension of the pin may be otherwise located with reference to the lockset and locking block portion thereof. Obviously the lockset portion of the pin may be offset beyond the knuckle thrower, that is, it may be on either side thereof; and, in one form of my invention the knuckle thrower is directly beneath the portion, C⁴. In the present instance I laterally elongate the lockset portion of the pin and form the portion, C⁶, at the end thereof, which is distant from the wall, A′. The position of the lockset lug, B⁵, when the knuckle is closed, is shown by dotted lines in Fig. 5. The knuckle thrower portion, C⁶, cannot in the present coupler occupy the same space, but may obviously extend downwardly from this portion of the lockset part, C⁵, or at either side thereof. When the locking pin falls into position to lock the knuckle as shown in Figs. 1, 2 and 5, the end of the portion C⁶ drops through the hole, A³, in the coupler head. I prefer that the knuckle-thrower shall be of substantially the length shown, otherwise no opening would be required in the bottom of the coupler head; though it may be desirable to thus engage the lower end of the pin when in locked position, to prevent the accidental lateral dislodgment or disarrangement thereof. When the pin is raised and thrown forward, after disengaging the knuckle, its knuckle thrower portion, C⁶, strikes the rear side of the knuckle tail forcing the latter outward in the manner indicated by Figs. 3 to 6. In Figs. 4 and 6 the pin is represented as having accomplished its forward stroke and to have returned to a position of rest upon the rearwardly projected top or shelf of the knuckle. The knuckle thrower operates best at the angle represented, but would perform the same function in substantially the same manner if the pin were constructed to swing in a plane coincident or parallel with the axis of the coupler.

The operation of the herein disclosed automatic coupler is as follows: When the knuckle and the locking pin are in normal, engaged or locked positions, as represented in Figs. 1 and 5, the locking block portion of the pin being in the path of the knuckle tail prevents the opening of the knuckle. To free the knuckle the pin is partly elevated. In pulling the pin the operating device or chain (not shown) also draws back on the upper end of the pin, hence, when the pin has been raised far enough to disengage its block portion, C⁴, from the knuckle tail, the lower end of the pin instantly swings forward and seats its lockset surface C⁵′, upon the lug, B⁵, on the back of the knuckle tail. If desired the pin may be left in this position as at the moment of uncoupling two cars. In such case the drawing away of the other coupler forcibly opens the knuckle of the coupler which has been unlocked. At this moment, although the lug on the knuckle is taken away from the pin, the inclined top of the knuckle tail swings beneath the overhanging part of the pin and continues to support the pin in raised positions. The shelves and projections upon the pin and knuckle finally engaging as shown in Figs. 4 and 6. When it is desired to not only unlock the knuckle, but also open the same, the pin is elevated the full distance allowed by the slot and the pin or bolt, E, having reached this position the further pull of the operating device forcibly drives the knuckle opener portion, C⁶, of the locking pin against the tail of the knuckle and drives the latter forward. If necessary the pin follows the knuckle to the limit of its movement, insuring the full opening of the coupler. When the knuckle is forcibly closed the lug, B⁵, thereon strikes the portion, C⁵, of the pin and drives the pin back out of the way so that the knuckle tail may pass to its closed position. This being done the pin is left without a support and instantly falls to its locked position. The necessary interference between the knuckle and the pin in closing is made certain by the downward incline on the knuckle tail and by slightly swelling the forward portion of the lockset on the pin, as shown by dotted lines C⁵″ in Figs. 5 and 6 and by full lines in the other figures, particularly, Fig. 12. The backward movement of the knuckle tail permits the pin to fall slightly so that the lug on the knuckle is sure to strike the lockset portion, C⁵, of the pin.

As stated herein various modifications of the particular structure which is illustrated will readily suggest themselves to those who are skilled in the art.

Having thus described my invention, I claim as new and desire to secure by Letters Patent:

1. In an automatic coupler, a coupler head and a swinging knuckle, in combination with a locking pin adapted for insertion, and extending through the top of the coupler head and adapted for vertical and swinging motions therein to lock said knuckle and to fully swing the same open respectively, substantially as described.

2. In an automatic coupler, a coupler head and a swinging knuckle, in combination with a locking pin extending, and adapted for insertion, through the top of the head and therein adapted for vertical and swinging motion to unlock said knuckle and fully open the same and said knuckle and pin having coacting lockset portions, substantially as described.

3. In an automatic coupler, a coupler head and a swinging knuckle, in combination with a locking pin extending through and pivoted in the upper part of said head to swing forward at its lower end to either partially or wholly throw said knuckle open and also adapted for vertical motion in said head to lock and unlock said knuckle, said pin being provided with a lockset portion intermediate of its ends to support the pin in raised position until it is swung forward to throw the knuckle, substantially as described.

4. In an automatic coupler, a coupler head and a swinging knuckle, in combination with a locking pin extending through and pivoted in the upper part of said head to swing forward at its lower end to either partially or wholly throw the knuckle open and also adapted for vertical motion in said head to lock and unlock said knuckle, said pin being provided with a lockset portion intermediate of its ends for engagement with the tail of the knuckle, substantially as described.

5. In an automatic coupler, a coupler head, in combination with a swinging knuckle, a locking pin extending through the top of said head and adapted for vertical movement in said head to lock and unlock said knuckle and also adapted for swinging movement in said head to either partially or fully open said knuckle, said pin having an intermediate lockset portion for engagement with the knuckle and shelves or lugs being provided on said knuckle and said pin to support the pin when the knuckle is open, substantially as described.

6. In an automatic coupler, a coupler head and a swinging knuckle, in combination with a locking pin extending through the top of the coupler head and adapted for vertical and swinging motion in said head, said pin having a locking block portion, a lockset portion and a laterally offset knuckle-thrower portion adapted for swinging engagement with said knuckle after the pin is raised and said pin and knuckle being provided with coacting portions adapted to support the pin when the knuckle is either partially or wholly open, substantially as described.

7. In an automatic coupler, a hollow coupler head having a pin opening in its top, in combination with a swinging knuckle, a fulcrum and pin in said opening and a vertically movable and forwardly swingable locking pin slidable and swingable on said fulcrum pin to lock, unlock and either partially or fully open said knuckle, substantially as described.

8. In an automatic coupler, a coupler head having a pin opening in its top, in combination with a swinging knuckle, a fulcrum pin in said opening and a vertically movable and forwardly swingable locking pin slidable and swingable on said fulcrum pin to lock, unlock and open said knuckle, said pin having an enlarged upper end normally closing the opening in the top of the head, substantially as described.

9. In an automatic coupler, a coupler head and swinging knuckle the tail of which terminates in a locking surface, in combination with a locking pin extending through the top of said head and vertically movable and swingable in said head and at its lower end provided with a laterally offset knuckle thrower portion to engage the back of the knuckle tail, and adapted to either partially or wholly open the knuckle when the pin is swung in the head substantially as described.

10. In an automatic coupler, a coupler head containing a pin and knuckle tail cavity and provided with a pin opening in its top, in combination with a swinging knuckle, a combined locking pin and knuckle thrower arranged in said cavity and extending through said opening, said pin, when in its lowest position, being adapted to lock said knuckle, and when fully raised, adapted to be swung forward at its lower end to engage the knuckle tail and fully open or throw the knuckle, substantially as described.

11. In an automatic coupler, a coupler head, in combination with a swinging knuckle, a knuckle locking pin normally occupying a vertical position in said head and adapted for vertical movement therein to unlock said knuckle, the upper end of said pin extending through the top of said head and being pivotally held therein and said head, knuckle and pin being constructed to permit the lower end of said pin to swing forward into engagement with the tail of the knuckle and to force or follow the same forward to its outermost or open position, substantially as described.

12. In an automatic coupler, a coupler head containing a pin and knuckle tail cavity and having a pin opening in its top, in combination with a swinging knuckle and a compound locking pin and knuckle thrower, adapted for insertion through said opening and normally closing the same, said pin and thrower being vertically movable in said head to lock and unlock said knuckle and also adapted to be swung into engagement with the tail of the knuckle without opening the same and to be thereafter swung forward, to either partially or fully open said knuckle, substantially as described.

13. In an automatic coupler, a coupler head containing a pin and knuckle tail cavity and provided with an opening in its top, in combination with a locking pin adapted for insertion through said opening and provided with an enlarged upper end to close said opening, a knuckle pivoted in said head and having a tail which is normally engaged with said pin, said pin being adapted for vertical movement in the head to unlock the knuckle tail and being provided with a laterally offset knuckle thrower portion which takes position behind the knuckle tail when the pin is raised, said pin, when in raised position, being adapted to be swung in said opening to engage its knuckle thrower portion with the tail of the knuckle and thereby force the knuckle into open position, substantially as described.

14. In an automatic coupler, a coupler head containing a pin and knuckle tail cavity, having a pin opening in its top and provided with a vertical stop wall that is inclined with relation to the axis of the head, in combination with a swinging knuckle having a tail that is provided with a locking surface normally parallel with the wall in the head, a locking pin having a laterally offset knuckle thrower portion at its lower end and adapted for insertion through the opening in the top of the head, the intermediate portion of said pin constituting a locking block, and said pin being slidably pivoted in said opening and therein adapted for vertical and swinging movement to first release the tail of the knuckle and then force the same to its outermost position, substantially as described.

15. In an automatic coupler, a coupler head containing a knuckle tail and pin cavity and provided with a stop wall and having an opening in its top, in combination with a knuckle provided in said head, and having a tail which is provided with an inclined top and a shelf or lug projecting therefrom, a locking pin slidably and pivotally mounted in the opening of the head and provided with a knuckle thrower portion for engagement with the back of the knuckle tail when the pin is raised and swung forward at its lower end, and said pin being adapted to be supported by the lug or shelf of the knuckle when the latter is in partially or in fully open position, substantially as described.

16. In an automatic coupler, a coupler head containing a pin and knuckle tail cavity and having an opening in its top, in combination with a swinging knuckle, a locking pin arranged for vertical and swinging motion in the opening of said head, to lock, unlock and open said knuckle, said pin being provided with a laterally offset knuckle thrower portion $C^6$ for engagement with the back of the knuckle tail when the pin is raised and swung forward, suitable means being provided for supporting the pin in lockset position, substantially as described.

17. In an automatic coupler, a hollow coupler head having a pin opening in its top and a laterally offset opening in its bottom, in combination with a knuckle pivoted in said head, a locking pin having an upper end extending through and adapted to close the opening in the top of the head and provided with a laterally offset knuckle thrower portion normally occupying the opening in the bottom of the head, said pin having a lockset portion for engagement with the tail of the knuckle and adapted for vertical movement to lock and unlock said knuckle and also adapted to swing forward to partially or fully open said knuckle, substantially as described.

18. In an automatic coupler, a hollow coupler head having an opening in its top and containing a vertical stop wall, in combination with a swinging knuckle having a tail provided with a lockset lug, a locking pin adapted for insertion through the opening in the top of the head, a fulcrum pin extending across said opening and limiting the vertical movement of the locking pin therein, and said locking pin being provided with a lockset portion to engage the lug on the knuckle tail, and also provided with a laterally offset knuckle thrower portion adapted to engage and force the knuckle open when the locking pin is swung on said fulcrum pin, substantially as described.

19. In an automatic coupler, a hollow coupler head containing a diagonal stop wall and having an opening in its top, in combination with a swinging knuckle and a locking pin occupying the space between said wall and the end of the knuckle tail and extending through and closing the opening in the head, said pin being adapted for vertical movement in the head to release the tail of the knuckle and also adapted for swinging movement in the head to force the knuckle open, said pin comprising a locking block portion, a laterally offset knuckle thrower portion, and an intermediate lockset portion, substantially as described.

20. In an automatic coupler, a hollow coupler head containing a pin opening in its top, in combination with a fulcrum pin extending across said opening, a locking pin having a slot which contains said fulcrum pin, said locking pin having a knuckle thrower portion on its lower end and a knuckle pivoted in said head and adapted to be locked therein by said locking pin and also adapted to be thrown open thereby, substantially as described.

21. An automatic coupler, comprising a coupler head containing a stop wall and provided with an opening in its top, in combination with a knuckle pivoted in said head and provided with a lockset lug B⁵, a locking pin having a locking block portion C⁴, a lockset portion C⁵, and a laterally offset knuckle thrower portion C⁶, the latter adapted to engage the back of the knuckle tail, said pin being adapted for insertion through the opening in said head and therein adapted for vertical and swinging movements to lock, unlock and throw said knuckle, substantially as described.

22. An automatic coupler, comprising a coupler head containing a pin and knuckle tail cavity, and having an opening in its top, in combination with a swinging knuckle provided with a lockset lug B⁵ and a pin supporting lug or shelf B⁴, a locking pin adapted for insertion in the opening in the top of the head and containing a slot E′, a fulcrum pin on the top of the head and extending through the slot in the locking pin, said locking pin having a locking block portion C⁴, a supporting lug C⁴′, a lockset portion C⁵ below the locking block portion, and a laterally offset knuckle thrower portion C⁶, to engage the back of the knuckle tail when the locking pin is raised and swung forward, substantially as described.

23. In an automatic coupler, a coupler head containing a pin and knuckle tail cavity and provided with a pin opening in its top, in combination with a knuckle pivoted in said head and having a tail provided with a locking end or surface, a locking pin occupying a vertical position in said opening for engagement with the end of the knuckle, means slidably pivoting said pin in the opening in the top of the head and said pin having a forwardly extending arm at its upper end above the head and also provided with a laterally and rearwardly projecting knuckle thrower portion on its lower end for engagement with the back of the knuckle tail when the pin is raised, substantially as and for the purpose specified.

24. In an automatic coupler, a hollow coupler head having a pin opening in its top and containing a diagonal stop wall, in combination with a locking pin extending through the opening in the head and having a locking block portion to engage said diagonal wall, a diagonally positioned fulcrum pin whereon said locking pin is slidably pivoted for vertical and swinging motion in said opening, a knuckle pivoted in said head and having a tail to engage the locking block portion of said locking pin, said locking pin being provided with a laterally offset knuckle thrower portion beneath the locking block portion and suitable lockset means, substantially as described.

In testimony whereof, I have hereunto set my hand, this 26 day of February, 1907, in the presence of two subscribing witnesses.

ARTHUR LIPSCHUTZ.

Witnesses:
F. G. KNIGHT,
A. W. NELSON.